PROCESS FOR THE MANUFACTURE OF PHOSPHORIC ACID IN THE WET WAY

Filed Jan. 2, 1970

NOTES                  BASIC PROCESS

FIRST STAGE

STEP I.

STEP I
FORM A SLUDGE OF REACTION PRODUCTS AGITATE.

---

STEP IA
ADD THE MAJOR PART OF PHOSHATE MINERAL TO SLUDGE OF STEP I. 80°C TO 60°C.
ADD MORE $H_2SO_4$ THAN IS NEEDED FOR THE REACTION
MAINTAIN 30 TO 120 g/l $SO_4^{--}$ IONS, PREFERABLY 50 TO 90 g/l.

---

STEP II
FORM A SLUDGE OF REACTION PRODUCTS AGITATE.

---

STEP IIA
TRANSFER ALL OR PART OF THE REACTION PRODUCT OF STEP IA TO THE SLUDGE OF STEP II
ADD ENOUGH PHOSPHATE MINERAL TO REACT WITH THE EXCESS ACID IN THE REACTION PRODUCT OF STEP IA. 75°C TO 50°C.
MAINTAIN 10 TO 30 g/l $SO_4^{--}$ IONS.

---

STEP III
SEPARATE PHOSPHORIC ACID FROM GYPSUM, e.g. BY FILTRATION.

---

STEP IV
WASH THE GYPSUM. RETURN THE WASH LIQUIDS TO STEP I

STEP V
RETURN ENOUGH $H_3PO_4$ TO THE SLUDGE OF STEP I TO MAINTAIN GOOD FLUIDITY, e.g. 35% SOLIDS

INVENTOR.
BERNARD BIGOT
BY Bauer and Seymour
ATTORNEYS

United States Patent Office 3,755,539
Patented Aug. 28, 1973

3,755,539
PROCESS FOR THE MANUFACTURE OF PHOSPHORIC ACID IN THE WET WAY
Bernard Bigot, Rouen, France, assignor to Produits Chimiques Pechiney-Saint-Gobain, Neuilly-sur-Seine, France, and U.C.B. (Union Chimique-Chemische Bedrijven) Brussels, Belgium
Filed Jan. 2, 1970, Ser. No. 250
Int. Cl. C01b 25/16
U.S. Cl. 423—320                        10 Claims

ABSTRACT OF THE DISCLOSURE

A method of making phosphoric acid and gypsum which comprises forming a first fluid reaction medium comprising the phosphoric acid product of the process, dividing the phosphatic raw material, in powder form, into major and minor fractions, mixing the major fraction with the first fluid reaction medium, mixing more sulfuric acid with the first fluid reaction acid than is required to react with the phosphatic raw material therein to form gypsum forming a second fluid reaction medium comprising the phosphoric acid product of the process, transferring product formed in the first reaction medium to the second reaction medium and mixing it therewith, mixing the minor fraction of phosphatic raw material with the second fluid reaction medium, and separating phosphoric acid from the gypsum.

---

This invention relates to the manufacture of phosphoric acid by the process in which natural phosphate and phosphate of fertilizer grade, of which the rock of Morocco, the pebble of Florida, and certain high phosphorus slags are examples, react with sulfuric acid to produce phosphoric acid and gypsum by a reaction which is simplified to the equation $$Ca_3(PO_4)_2 + 3H_2SO_4 \rightarrow 2H_3PO_4 + 3CaSO_4$$

the gypsum appearing hydrated as $CaSO_4 \cdot 2H_2O$. A technique of ancient origin conforming to that equation is still in industrial use, and its unsolved problems are well known to its practitioners, among which are the failure of the phosphate to dissolve rapidly and completely, the production of an acid of less than satisfactory concentration, the difficulties of filtration, of washing of the by-product gypsum, and the lack of purity of the gypsum.

The prior reactions did not completely dissolve the raw phosphate and the yield was reduced by losses of $P_2O_5$ in the part of the phosphate not acted on by the acid, either because the grains were too large or because of imperfect contact between the mineral powder and the acid. Imperfect contact can arise from incomplete dispersion or, when the sulfuric acid used to open the rock is too concentrated, by the formation of calcium sulfate of low solubility on the surface of the grains of phosphate. In order to reduce the severity of such losses resort has been had to very fine grinding, an expensive process, by extending the time of the reaction, by energetic dispersal techniques requiring undesirable costs in power, by using a more dilute sulfuric acid with attendant reduction in the concentration of the product, and by an extra step of wetting the phosphate powder before mixing it with the acid.

Another loss of $P_2O_5$ was due to the simultaneous crystallization of bicalcium phosphate and bicalcium sulfate, which entrained $P_2O_5$ with the gypsum and was lost as syncrystallized $P_2O_5$. The syncrystallized $P_2O_5$, usually not negligible in quantity, reduced the yield of acid, constituted an impurity in gypsum, and required the after-treatment of the gypsum to purify it to proper standards and to recover absorbed $P_2O_5$. If the quantity of $P_2O_5$ syncrystallized was somewhat less in an excess of acid, such excess produced an increased loss as described above. The process was further complicated because the production of syncrystallized $P_2O_5$ is less with the phosphates more difficult to open, and when the attack and recrystallization produces crystalline forms of different degrees of hydration.

A standard method of combating this compilation of problems is to arrange a series of vats in cascade, to distribute the acid of attack through the several vats according to some formula, and to recycle great volumes of the reaction products of the downstream vats to the upstream vats, the recycle often amounting to six to ten times or more the quantity of product withdrawn for marketing. Such working, recycling, and reworking of the materials is costly in time and apparatus and involves double or more crystallizations.

Those processes which employ double crystallization have the imperfections of multiplication of apparatus, large size of apparatus to handle the recycle, the slow pace of some reactions, the troubles inherent in the use of high temperatures, and in the corrosion which is involved under such circumstances. Such processes generally produce good yields of $P_2O_5$, eliminate volatile impurities such as fluorine more completely than less complex prior processes, but such advantages do not counterbalance the imperfections.

Whatever may be the process employed it is important to produce the calcium sulfate in a form which is readily filterable in order to use the smallest possible filters and to limit the losses of $P_2O_5$ resulting from filtration and from the washing of the solid. It is therefore important industrially to obtain a maximum yield of phosphoric acid, to eliminate losses, to obtain better speeds of reaction and filtration, and to overcome the technical complications flowing from high temperatures and repeated transfers of large volumes of sludge.

It is an object of the invention to reduce the number of operations required in the manufacture of phosphoric acid. Another object is to reduce the losses of $P_2O_5$. Another object is to reduce the time required by the process. Another object is to reduce the sizes and number of apparatus. Another object is to produce the gypsum in a highly filterable form. Another object is to reduce the recycling of products from downstream to upstream locations, to eliminate the bulk of retreatment and recrystallization, to open the phosphatic raw material in fewer steps, to produce the phosphoric acid in high yield, and to produce the gypsum in a state sufficiently pure to be marketed without further treatment.

The objects of the invention are accomplished generally speaking by a method of making phosphoric acid and gypsum which comprises forming a first fluid reaction medium comprising the phosphoric acid product of the process, dividing the phosphatic raw material, in powder form, into major and minor fractions, mixing the major fraction with the first fluid reaction medium and forming gypsum, mixing more sulfuric acid with the first fluid reaction than is required to react with the phosphatic raw material therein, forming a second fluid reaction medium comprising the product of the process, transferring product formed in the first reaction medium to the second reaction medium and mixing it therewith, mixing the minor fraction of phosphatic raw material with the second fluid reaction medium, and separating phosphoric acid from the gypsum.

The phosphate is divided into two parts, the first one being greater than the second, greater than 50% of the total. The relative percentages of the two parts are measured in relation to the desired content of $H_2SO_4$ in the two reaction vats.

For practical operation the solubilization of the ore is better in a reaction medium containing an excess of $H_2SO_4$ when about 90% of the phosphate is devoted to the first vat, treated under favorable conditions, and the additional amount, generally 10%, is devoted to the second vat. These percentages vary with the desired product and also with the source of rock. However, the process is operative with other divisions showing a material disproportion in the respective weights.

The powdered phosphate is slurried with the weak acid from the filter, which acts as a wetting agent. The recycled phosphoric acid contributes to the solubilization, according to the reactions:

(a) The phosphate rock dissolves in phosphoric acid to give monocalcium phosphate in solution $$Ca_3(PO_4)_2 + 4H_3PO_4 \rightarrow CaH_4(PO_4)_2$$

(b) Monocalcium phosphate reacts immediately with $H_2SO_4$ mixed with $H_3PO_4$ $$3Ca_4(PO_4)_2 + 3H_2SO_4 \rightarrow 3CaSO_4 + 6H_3PO_4$$

The pH of the weak phosphoric acid is not significant.

The process is based upon the excess of $H_2SO_4$ in the two reaction zones.

The amount of sulfuric acid in the first vat is chosen for the best solubilization of the ore, especially with respect to the amount of $P_2O_5$ syncrystallized. $H_2SO_4$ need not be added to the second vat.

By this process the applicant has produced phosphoric acid continuously with an overall yield of 99% of the $P_2O_5$ in the mineral, the gypsum appearing in an easily filterable form easy to wash containing so little $P_2O_5$ and fluorine that the process does not require the recirculation of any important amount of the reaction sludges.

The novel process requires only two vats, each of which is filled with the reaction product of the process, which acts as a reaction medium. In the first vat is carried out the first of the two basic steps of the process. The incoming crushed phosphate, in appropriate particle size, is divided into a major and a minor part, the major part being directed into the first vat, in which conditions of concentration and temperature are maintained which are favorable to the formation of gypsum. To the first vat is added a quantity of sulfuric acid superior to the amount necessary to the reaction. After this reaction has proceeded sufficiently the reaction product is transferred to the second reaction medium in the second vat and the minor part of the crushed phosphate is added. In this second vat the excess of acid from the first vat reacts with the minor portion of the raw phosphate under conditions favorable to the formation of gypsum. In a modification of the invention the slurry resulting from an additional treatment of recrystallization is sent to the first vat. The slurry resulting from the previous treatment is sent to the first vat. The slurry is made of gypsum separated after the second stage and partially dehydrated by a mixture of phosphoric and sulfuric acids. After partial dehydration the reacted slurry is sent to the first vat. After reaction the product is filtered, the gypsum remaining on the filter and the phosphoric acid becoming the filtrate. Under all normal circumstances the process will be carried out by continuous flow but it can also be carried out vat by vat or stepwise. Each of the two steps of reaction is preferably carried out in a single vat without compartments, in which the reactants are dispersed rapidly and homogeneously by means of agitators of sufficient power. In the practice of the invention the content of the reaction medium in $SO_4^{--}$ in solution should be between 30 and 120 g./l. in the first vat and between 10 and 30 g./l. in the second vat. The phosphate is added so as to keep within these ranges of concentration. The content of $SO_4$ ions in solution in the first reaction vat is to be chosen in relation to the constitution of the natural phosphate, being the greater as the phosphate is the more rapidly attacked. It is, in the preferred form, generally between 50 and 90 g./l.

The temperature in the first reaction vat is desirably between 80° C. and 60° C. and in the second vat between 75° C. and 50° C.

When the reaction product is discharged from the second vat onto the filter it is washed with water after the phosphoric acid has been taken off to storage and the wash water from the gypsum flows to the first vat to form a part of the reaction medium. A part of the strong phosphoric acid can also be returned to the first vat in order to maintain in the vats the conditions of fluidity necessary for efficient agitation and good reaction. Such conditions are attained satisfactorily when the reaction medium is a sludge containing about 35%, or more or less, of solid matter.

In one modification of the invention the entire contents of the products of reaction of the first vat flow in a continuous stream into the reaction medium of the second vat and the products of the reaction in the second vat flow in a continuous stream to a filter through which the strong acid passes and upon which the gypsum and other insoluble compounds remain. Continuous filters, for instance involving a traveling filter belt, are known and can be used for this purpose. After the removal of the strong acid the gypsum is washed and the wash water and a part of the strong phosphoric acid are sent back to the first vat. I have established that the operative conditions in the second vat are less favorable to the elimination of syncrystallized $P_2O_5$ than those of the first vat and that then is consequently some loss of $P_2O_5$ in the gypsum but this loss is very small. It is therefore possible with this invention not to filter the gypsum formed in the first stage apart from that formed in the second stage and it has been observed that the omission of this step does not decrease the yield of soluble $P_2O_5$ of the first vat.

It may be advantageous, if one wishes to make phosphoric acid particularly low in sulfuric acid, to use a second modification of the invention according to which the gypsum formed in the first stage is filtered and washed and the whole or a part of the filtrate is transferred to the second vat with the minor portion of the phosphate after which the acid thus produced is removed. In this modification the gypsum removed after the second stage of reaction may be acted upon in several ways: It may be washed and the wash water returned to the first vat; or more simply, the gypsum removed after the second vat may be returned to the first vat without washing. It is also possible to improve even more the over-all yield of the process by submitting the unwashed gypsum derived from the second vat to a supplementary treatment with a mixture of weak phosphoric acid mixed with sulfuric acid before returning it to the first reaction stage. Under these conditions the content of $SO_4$ ions, of $P_2O_5$, and the temperature of the mixture are maintained so as to partially dehydrate the gypsum and liberate the major part of the syncrystallized $P_2O_5$ formed in the second reaction stage. To this end it is advantageous to use an aqueous solution containing 5–25% $P_2O_5$ and 200–500 g./l. of $H_2SO_4$. The product of this reaction is returned to the first vat, usually without separating the solids out.

When the calcium sulfate (gypsum) formed in the second vat is returned to the first vat, with or without intermediate dehydration, there is another possibility of shortening the residence of the reactants in the second stage: The reaction which produces the solubilization of the phosphate and the precipitation of the gypsum is then completed in the first stage.

Under ordinary conditions of routine operation the product contains 33% $P_2O_5$ and a content of $SO_4$ ions between 8 and 100 g./l. depending upon the relation of the $H_2SO_4$ to the content of the reaction vats, this being adjustable at will. The gypsum obtained is well crystallized which permits ready filtering and washing. The content of $P_2O_5$ in the gypsum is usually less than .3%.

The over-all yield of $P_2O_5$ is on the order of 99%.

The process has the advantage of producing these yields with different kinds of phosphates. It is particularly advantageous with phosphates which have the reputation of being easily attackable but which when treated by conventional processes have much lower yields. In this invention the yields of 99% are obtained without prejudice to the other advantageous properties of yield by such phosphates notably speed of attack. The process is also applicable with advantage to the less reactive phosphates and, with them, produces gypsum of exceptionally high purity. Another advantage is the ease with which the content of sulfuric acid in the phosphoric acid is controlled. Phosphoric acid having a relatively high content of sulfuric acid is advantageous in some applications such as the manufacture of enriched superphosphate fertilizers, the sulfophosphates of ammonia, the manufacture of sulfo-phospho-nitro attack complexes, and in the extraction of phosphoric acid by organic solvents. Such acids of high sulfuric content may be withdrawn from the first reaction stage.

Acids of which the sulfuric content is low may be employed directly, for instance in the manufacture of alkali phosphates, or they may be raw material for the preparation of phosphate fertilizer of high concentration. Such acids are furnished by the second reaction stage. Furthermore, the exact content of $H_2SO_4$ desired can be established in advance to suit the necessity of various uses, particularly by controlling the operating conditions existing in the second vat.

The gypsum contains only a small quantity of $P_2O_5$, usually on the order of .25% which allows it to be used in many processes without purification. Among advantages are the high degree of solubilization achieved in the first reaction vat, the very low loss of $P_2O_5$ in the second reaction vat, and the excellent conditions of filtration which reduce washing losses to a very low level.

The apparatus is quite simple, vats such as described in French Pat. No. 1,125,849 being quite satisfactory.

The accompanying flowsheet generally illustrates the invention.

The following examples illustrate the invention without importing limitations:

EXAMPLE 1

A vat provided with an agitator received a continuous stream of 100 parts per hour of crushed Moroccan phosphate of which the granulometry was such that its particles passed through a screen having apertures of 0.08 mm. At the same time 95–112 parts of 93% $H_2SO_4$ were admitted, after having been preliminarily mixed with dilute phosphoric acid. The temperature of the reaction mass was 70° C.; it was a sludge containing about 36% solids. There was a continuous flow of the product of reaction into a second vat of the same type which received a complementary quantity of the same phosphate of the same particle size sufficient to react with the excess of sulfuric acid. The outflow from the second vat was transferred to a continuous filter having a series of washing stations after the station at which the phosphoric acid was filtered off. The gypsum cake was washed and the wash liquid flowed to the first vat together with some of the phosphoric acid. The gypsum was easily washed and its residual content in $P_2O_5$ could be determined readily, furnishing the overall yield of the process.

Several series of tests were made with the same phosphate in different particle sizes, 72% passing through a screen of .08 mm. in the first test, 52% in the second test, and 30% in the third test.

In the first series of tests the phosphate was treated in a first vat containing a sludge of which the liquid phase contained 75 g./l. $H_2SO_4$, 33.5% of $P_2O_5$, and of which the temperature was 70° C., the mean time of reaction was 5 hours 40 minutes. The products of reaction were transferred to a second vat in which the liquid phase of the sludge contained 25 g./l. $H_2SO_4$ and in which the mean residence was 1 hour 10 minutes. The overall yield was 99.1%.

In the second series of tests the same sulfuric acid solutions were used as in the first series of tests but the duration of residence was reduced to 3 hour 35 minutes in the first vat and 40 minutes in the second. The overall yield was 98.55%.

In a third series of tests operating under the conditions of the second series but with a sulfuric acid content of 100 g./l. and at 60° C. in the first vat, the overall yield was 98.65%.

In a fourth series of tests, using the conditions of the second series except that the sulfuric acid content in the first vat was 50 g./l. and the temperature 75° C., the total yield was 98.15%.

In another series of tests of which only 52% of the phosphate passed the .08 mm. screen the first stage of treatment was in a reaction mass containing 75 g./l. of $H_2SO_4$ in the liquid phase and of which the temperature was 70° C. The mean duration in the first vat was 5 hours 40 minutes and in the second 1 hour 10 minutes. The yield was 98.9%. The sulfuric acid content of phosphoric acid produced in the second vat was 25 g./l.

In another test using the same duration of residence as in the preceding example, the yield was 98.7% and the concentration of $H_2SO_4$ was 15 g./l. of phosphoric acid.

In another test the mean duration of residence in the two vats was 3 hours 40 minutes in the first and 40 minutes in the second vat. The yield was 98.4% and the phosphoric acid contained 25 g./l. of $H_2SO_4$.

Another series of tests was carried out on phosphate which had been broken only to an extent such that 30% of the particles would pass a .08 mm. screen. In the first of these tests the mean time of residence in the two vats was 5 hours 40 minutes and 1 hour 10 minutes respectively. The sulfuric content of the liquid phase of the first vat was 75 g./l. and the yield was 98.7%.

In another test, carried out as in the preceding example except that the content of sulfuric acid in the first vat was 50 g./l. the yield was 98.4%.

In another test the first vat contained 50 g. of sulfuric acid per litre of liquid and the duration of residence in the two vats was respectively 3 hours 40 minutes and 40 minutes. The yield was 97.9%.

If we give numbers to the foregoing tests in the order in which they appear, tests numbers 1, 5 and 8, in which the operation was carried out with equal duration in the vats and with equal sulfuric acid content in the first vat, we find that the fineness of the particles as represented by the percentages which pass through the screen gave yields of 98.7 for test 8, 98.9 for test 5, and 99.1 for test 1. Therefore, it is desirable to divide the phosphate into fine particles, particularly for short periods of residence.

If we compare the result of the third test hereinabove with those which are attained by prior art procedures in a single vat with the same phosphate and a particle size of which 72% pass the screen, there was produced after 4 hours residence in the reaction vat, of which the liquid phase contained 25–28 g./l. of sulfuric acid, a yield of 97.5%. Therefore, the present invention has the advantage of a substantially greater yield (98.65% in the 11th test instead of 97.5%) with a duration of residence of the same order in the first vat. This superior recovery is highly desirable.

EXAMPLE 2

Moroccan phosphate was crushed until 72% of the grains passed a screen of .08 mm. and 100 parts/hr. thereof were poured into a vat, similar to that in Example 1, containing the same reaction medium. 106 parts of 93% $H_2SO_4$ were admitted during the same period of time, premixed with dilute phosphoric acid from the washing filters at the end of the phosphate. After 6 hours residence at 70° C., the product of reaction was a sludge containing about 35% solids, 75 g./l. $H_2SO_4$ and 30% of $P_2O_5$ in the liquid phase which is then sent to a vacuum filter having multiple washing stations. The test was continued by sending the filtrate from the filter under vacuum to a second vat which received the same Moroccan phosphate as in the first vat. The reaction mass contained 33–34% $P_2O_5$ and 25 g./l. $H_2SO_4$. After an average mean time of residence of 4 hours the product was withdrawn and sent to a separator which removed the phosphoric acid and returned the separated solids to the first stage without washing. The separation can be accomplished by filtration. It is also possible to completely eliminate the second filtration and to replace it by a decantation, recycling a thick sludge to the first stage; the overall yield of soluble $P_2O_5$ was 98.9%.

EXAMPLE 3

Operating as in Example 2 the filtrate from the first vat was forwarded to a second vat which received the same Moroccan phosphate as the first vat in such quantity that the reaction mass contained 10 g. of sulfuric acid per litre of liquid. The gypsum was removed from the product. In a first test the gypsum was sent directly to the first vat. The overall yield of soluble $P_2O_5$ was 98.6%.

In another test the gypsum removed from the final product was sent to a mixer upstream of the first vat where it was treated by a mixture of 93% sulfuric acid such as was supplied to the first vat, and of recycled phosphoric acid. The mixture of acids contained about 15% $P_2O_5$ and 400 g./l. of $H_2SO_4$. The temperature was kept at 80° C. At the end of a few minutes the gypsum was dehydrated and recrystallized, liberating the major part of syncrystallized $P_2O_5$. The overall yield of the total operation was 99%.

This is a continuous method of making phosphoric acid from natural phosphate and sulfuric acid in which, in a first stage, in the midst of a sludge formed of the reaction product of the same reactants, the major part of the phosphate is reacted under conditions of concentration and temperature which are favorable to the formation of gypsum. The first vat contains more sulfuric acid than is necessary to the reaction. The reaction product of the first reaction mass is sent to a second vat containing a similar or identical reaction medium and receives a supplementary quantity of phosphate, which reacts with the formation of gypsum. The phosphoric acid is removed from the second reaction product. The flexibility of the process is illustrated by the following variations which can be used alone or together.

Each of the two stages of reaction is carried out in a single vat in which the materials introduced are dispersed rapidly and homogeneously by agitation, a content of $SO_4$ ions of 30–120 g./l. being maintained in the first vat and 10–30 g./l. in the second vat;

The ionic content ($SO_4^{--}$) in solution in the first reaction stage is made to vary according to the nature of the phosphate being acted on, this content being the greater as the phosphate is the more readily attacked, generally being between 50 and 90 g./l.;

The temperature of the first reaction mass is between 80° C. and 60° C. and that of the second reaction mass between 75° C. and 50° C.;

The wash liquid from the gypsum yielded by the product of the second vat is sent to the first vat with a part of the strong phosphoric acid which constitutes the final product, the quantities sent being sufficient to maintain good working conditions of fluidity;

In a variation of the process the gypsum formed in the first stage is removed and washed before reaching the second stage, all or a part of the filtrate from the first stage being mixed with the second stage reaction mass, which also receives a complementary quantity of phosphate, the course of treatment being achieved according to any of the following modes:

(a) The acid thus produced is isolated, the gypsum is washed, and the wash water is returned to the first reaction stage.

(b) The acid produced is removed from the gypsum and the gypsum is mixed with the first reaction mass without washing.

(c) The acid produced is separated from the gypsum, the gypsum is then treated with a mixture of weak phosphoric acid and sulfuric acid and the product of this reaction is sent to the first reaction vat. In this process the gypsum is dehydrated and the bulk of the syncrystallized gypsum is recovered.

As many apparently widely different embodiments of the present invention may be made without departing from the spirit and scope thereof, it is to be understood that the invention is not limited to the specific embodiments.

What is claimed is:

1. A method of making phosphoric acid and gypsum from solid phosphatic raw material containing calcium phosphate, which comprises forming a first fluid reaction medium comprising a slurry of water, phosphoric acid and gypsum, introducing into said fluid reaction medium, a major fraction of the finely-divided solid raw phosphatic material containing calcium phosphate, the amount of solid raw phosphatic material introduced being up to about 90% of the total solid raw phosphatic material to be treated in the process, introducing sulfuric acid into said first reaction medium in an amount which will maintain a concentration of $SO_4^{--}$ ions between about 30 and 120 g./l., and which is in substantial excess of the quantity that will react with the solid raw phosphatic material to be treated, agitating the fluid reaction medium at a temperature from about 60° C. to about 80° C., forming a second fluid reaction medium comprising water, phosphoric acid and gypsum, transferring the product of the first reaction medium to the second reaction medium, introducing into the second fluid reaction medium the remaining fraction of the finely-divided solid raw phosphatic material to be treated, agitating the second fluid reaction medium at a temperature of from about 50° to 75° C. in the absence of added sulfuric acid, the fraction of the finely-divided solid raw phosphatic material being sufficient in quantity to maintain a lower concentration of $SO_4^{--}$ ions in the second fluid reaction medium, in the range of between 10 and 30 g./l., said concentration being conducive to the formation of gypsum, separating the phosphoric acid from the gypsum formed in the second fluid reaction medium and returning at least a portion of the phosphoric acid to the first fluid reaction medium.

2. A method according to claim 1 in which the concentration of $SO_4^{--}$ ions in the first reaction medium is between 50 and 90 g./l.

3. A method according to claim 1 in which the separated gypsum is washed and the wash liquid is recycled to the first fluid reaction medium.

4. A method according to claim 1 in which the separated gypsum is washed and the wash liquid is recycled to the second fluid reaction medium.

5. A method according to claim 1 in which the slurry in the first fluid reaction medium contains about 35% solids.

6. A method according to claim 1 in which the product transferred from the first reaction medium to the second reaction medium is filtered to remove gypsum, the removed gypsum is washed and the wash liquid is returned to the first reaction medium, and in which the product of the second reaction medium is filtered to remove the phosphoric acid from the gypsum, and the gypsum is washed and the wash liquid is returned to the first reaction medium.

7. A method according to claim 1 which comprises filtering the product removed from the first reaction medium to separate gypsum, washing the gypsum and forwarding the wash liquid to the second reaction medium, filtering the product from the second reaction medium to separate the phosphoric acid and to remove the gypsum, and mixing the gypsum with the first reaction medium without washing.

8. A method according to claim 1 in which the gypsum removed from the second reaction medium is reacted with weak phosphoric acid and sulfuric acid under conditions of $SO_4^{--}$ ion concentration, $P_2O_5$ content and temperature to at least partially dehydrate the gypsum and to liberate syncrystallized $P_2O_5$ and this reaction product is mixed with the first reaction medium, said medium in which the gypsum is reacted is aqueous and contains from about 5 to 25% $P_2O_5$ and 200 to 500 g./l. of sulfuric acid.

9. A method according to claim 1 in which the phosphatic raw material is phosphate rock.

10. A method according to claim 1 in which the phosphatic raw material is pebble phosphate.

References Cited

UNITED STATES PATENTS

| | | | |
|---|---|---|---|
| 3,619,316 | 11/1971 | Case | 23—165 |
| 3,472,619 | 10/1969 | Chelminski et al. | 23—165 |
| 2,233,956 | 3/1941 | Moore | 23—165 |

FOREIGN PATENTS

| | | | |
|---|---|---|---|
| 1,212,825 | 3/1960 | France | 23—165 |
| 1,556,482 | 12/1968 | France | 23—165 |

OSCAR R. VERTIZ, Primary Examiner

G. A. HELLER, Assistant Examiner

U.S. Cl. X.R.

423—166